Dec. 4, 1956   B. J. KERWIN ET AL   2,772,732
WEB SLITTING APPARATUS
Filed Aug. 11, 1953   2 Sheets-Sheet 1
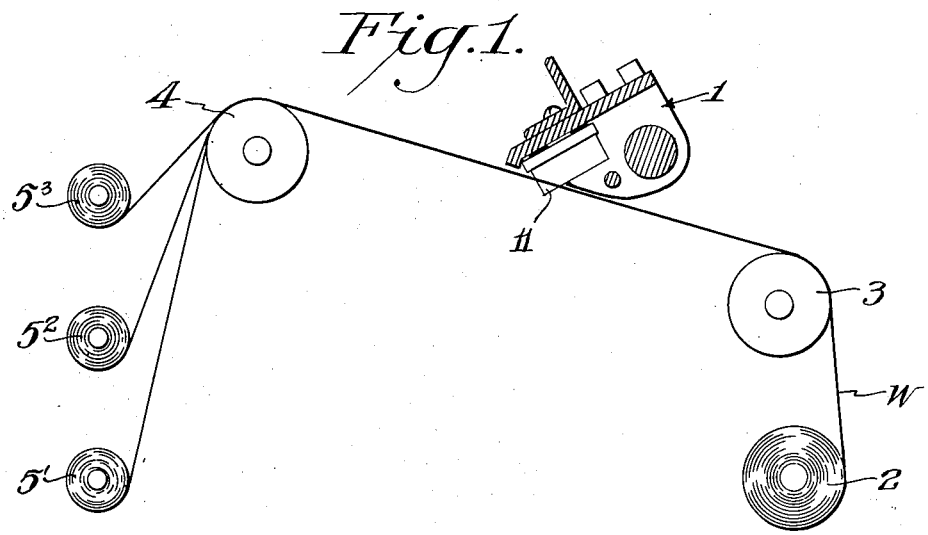
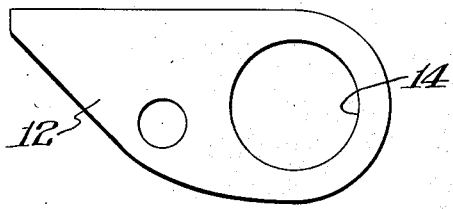 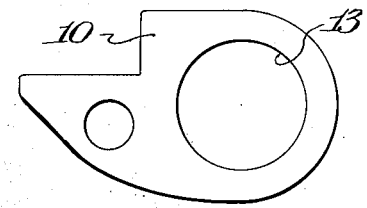
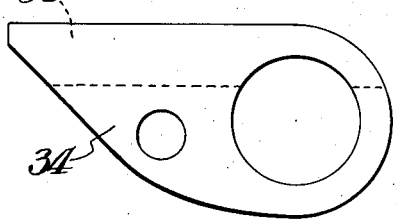 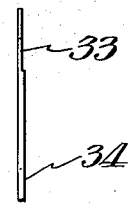
INVENTORS
BERNARD JOSEPH KERWIN
ELIAS WACH
BY P. Ralph Snyder
ATTORNEY

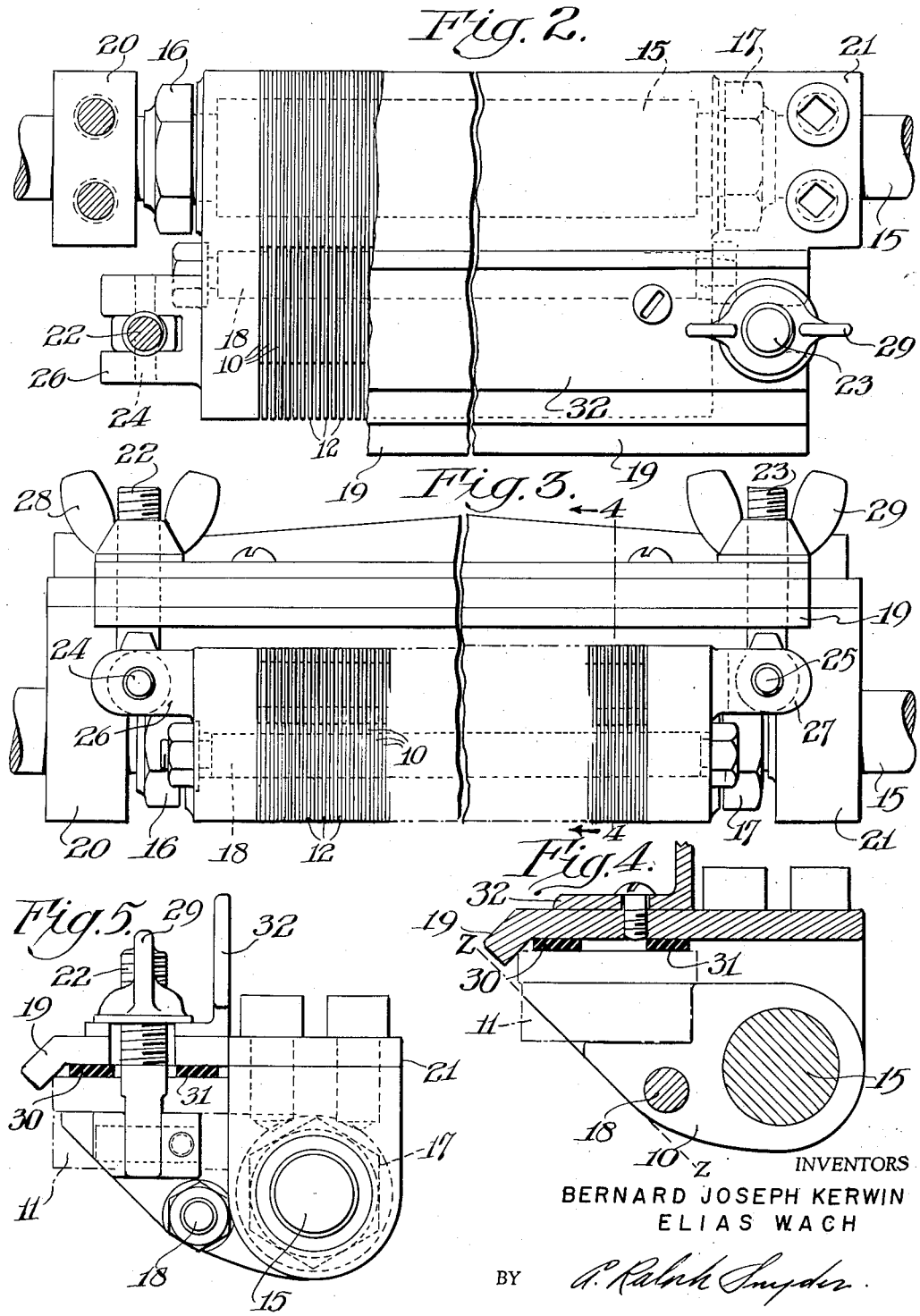

United States Patent Office 2,772,732
Patented Dec. 4, 1956

2,772,732
WEB SLITTING APPARATUS

Bernard Joseph Kerwin, Tonawanda, and Elias Wach, Buffalo, N. Y., assignors to E. I. du Pont de Nemours & Company, Wilmington, Del., a corporation of Delaware Application August 11, 1953, Serial No. 373,566

4 Claims. (Cl. 164—39)

This invention relates to an improvement in slitting apparatus, and, more particularly, to a holder for a multiplicity of slitting elements.

The prior art is replete with various types of apparatus for slitting continuous webs of such materials as paper, textile fabrics, rubber, leather, and continuous films of such thermoplastic polymers as polystyrene; polyvinyl chloride; polyvinylidene chloride; rubber hydrochloride; various polyamides, such as polyhexamethylene adipamide; copolymers of vinyl chloride and vinyl acetate, polyethylene terephthalate, etc. In general, the term "slitting" applies to cutting a continuous web or individual sheets into subdivisions. As employed with respect to the apparatus of the present invention, the term "slitting" will apply essentially to the procedure of continuously cutting a continuous length of web or film along its longitudinal axis at predetermined transverse intervals.

In slitting apparatus, the cutting elements may be in a variety of forms, for example, razor blades, knife blades, thin wires (normally employed while hot), revolving discs which slit in air or in a groove, discs having a flat surface which cut by a shearing action, etc. The actual slitting operation may be carried out in air, i. e., wherein the film is in contact with no other surface except the cutting element, or the film may be slit as it is passed over a grooved roll, for example, wherein the cutting edges are riding or rotating in the grooves. Slitting or cutting a continuous web by a shearing action usually involves employing an apparatus comprising rotating discs having a flat or beveled peripheral surface, these discs intermeshing with the grooves of a second rotating cylindrical surface; and the web is continuously sheared by the action of the side of a disc bearing against an adjacent wall of a groove.

An object of the present invention is to provide an improvement in an apparatus wherein a continuous web or length of film is slit longitudinally upon passing between two tensioning means, e. g., two driven or idler rolls. A further object of the present invention is to provide a suitable apparatus for holding a multiplicity of cutting elements, e. g., razor blades. A further object of the present invention is to provide an apparatus for holding a multiplicity of cutting elements and wherein the cutting elements may be replaced without disturbing the setting of adjacent cutting elements and without disturbing the web. A further object is to provide such a holding apparatus for slitting a continuous web into predetermined width increments. Other objects will be apparent from the following description of the invention.

The above objects are accomplished in accordance with the present invention by providing an improved severing means operative to slit a continuous web along its longitudinal axis at predetermined transverse intervals as the web passes under tension between two spaced web guide means, said improved severing means comprising a member positioned above and extending transversely of the path of travel of the web between the guide means, a plurality of slots in said member each seating a cutter blade with a portion of the cutting edge projecting into said path of travel of the web and with the top edge of each blade opposite the cutting edge extending above said member, and a cover plate extending the length of said member and bearing on said top edge of each of said blades, means for locking the cover plate to the member whereby to clamp the cutter blades in the slots, and means for shifting the cover plate out of contact with the cutter blades.

The following description is to be read in connection with the accompanying drawings wherein:

Figure 1 diagrammatically illustrates an overall arrangement wherein the present apparatus may be employed;

Figure 2 is a top view of a specific embodiment of the present invention;

Figure 3 is a front view of the specific embodiment shown in Figure 2;

Figure 4 is a cross-sectional view, section A—A of Figure 3, of the specific embodiment;

Figure 5 is an end view of the specific embodiment;

Figure 6 is an individual component of the holder body, this component being in the form of a flat metal plate and serving as a spacing element;

Figure 7 illustrates the cross-sectional configuration of a different element of the holder body, this element being in the form of a flat metal spacer plate and positioned between elements of the type illustrated in Figure 6;

Figure 8 is an illustration of a different type of individual component of the holder body, this type being usable in place of the combination of those shown in Figures 6 and 7; and Figure 9 is a cross-sectional view of Figure 8 at section B—B.

Referring to Figure 1, the present apparatus generally designated by the reference numeral 1 is positioned above the surface of a continuously moving web of material to be slit, the web being slit in air, i. e., the web being in contact with no other surface except the protruding edges of the cutting elements. Any conventional means may be employed for supporting and moving the film in a plane below and perpendicular to the planes containing the cutting elements held by the present apparatus. For example, in normal operation, and particularly for the purpose of obtaining uniform slitting, the film is passed over tensioning rolls which may be either positively driven or idlers, the main objective being to maintain the film under uniform tension during the slitting operation. As illustrated in Figure 1, the web W is unrolled from a supply roll 2, and it then passes over a tensioning roll 3 before being slit longitudinally by the cutting elements of the cutting apparatus. The individual strips slit from the web are then passed over a tensioning roll 4, and the strips are wound upon suitable winding means 5, 5'. It should be understood that any suitable known arrangement may be employed for moving the continuous web in a plane beneath the cutting apparatus of the present invention, the present apparatus not being restricted with respect to any particular slitting apparatus or machine with which it may be incorporated.

The present invention is particularly useful with respect to employing single edge razor blades as the cutting elements, the term "single edge razor blade" applying to any blade having the same general configuration as a conventional razor blade and having a clip attached to the edge opposite the cutting edge. In describing the present apparatus with reference to the remaining drawings, the cutting elements in all cases will be understood to be in the form of single edge razor blades.

The cutting apparatus, illustrated in Figures 2-7, comprises a multiplicity of flat plates 10, each of which, in the preferred modification of the invention, is of the thickness of the blade to be used and has substantially the shape of a sled runner; i. e., it is curved on the underside, the forward upper part of the plate being cut away sufficiently to provide a seat for blade 11, which, as stated above, is preferably a razor blade having a clip opposite the cutting edge. The blade when seated protrudes forwardly of the plates to expose a portion of the cutting edge of the blade. Alternating with plates 10 are spacer plates 12, each of which has substantially the shape of plate 10, but differs from plate 10 in that the forward upper part thereof is not cut away. The combination of a multiplicity of plates 10 and plates 12 alternately disposed thus defines a composite body having a plurality of slots lying in planes perpendicular to the axis of shaft 15, which slots provide seats for the blades in the manner hereinafter described. Registered holes 13 and 14 at the rear of plates 10 and 12, respectively, sized for a close fit on screw-threaded shaft 15 provide for mounting of the plates on said shaft; and nuts 16 and 17 serve to press the assembled plates tightly together on shaft 15 to form a composite body rotatable with the shaft which, in turn, may be suitably mounted for rotation when desired to shift the assembly out of the path of the web being slit. A removable rod 18 extending through the plate assembly forwardly of the shaft adds rigidity to the plate assembly.

As illustrated in Figure 4, the angle between the protruding side of the razor blade 11 and the surface of the holder body is approximately 45 degrees. That is, the web being slit is moved in a path substantially parallel to this surface of the holder body, that is, parallel to line Z—Z of Figure 4, and the web is slit by the protruding cutting edge 11 of the razor blades. Moreover, the clip on the razor blade does not fit into the slots of the plate assembly but is positioned on top of the spacer plates whereby the clip forms a bearing surface on which pressure may be applied to lock the blade firmly in place. In the specific embodiment illustrated, this pressure is applied by pressure cover plate 19 extending the entire length and width of the plate assembly and mounted for independent rotation about shaft 15 by means of collar bearings 20 and 21 bolted at each end of the cover plate. The cover plate is further provided with slots to receive screw-threaded bolts 22 and 23, pivotally mounted by pins 24 and 25, respectively, on split lugs 26 and 27 fixed to the ends of the plate assembly. With the bolts in place in the slots, the cover plate is maintained in proper relationship with the plate assembly and blades therein by suitably tightening wing nuts 28 and 29 on the bolts. Preferably, parallel rubber strips 30 and 31 running the full length of the cover plate are cemented on the under side thereof to provide resilient contact with the clips of the razor blades.

For the purpose of changing razor blades or rearranging the location of the blades in the assembly, it is only necessary to unloosen the wing nuts, swing the bolts 22 and 23 out of their respective slots, and pivot the freed cover plate out of contact with the blades so as to permit access to, and manipulation of the blades. Thus, it is apparent that by reason of this arrangement, one or more of the blades may be moved without changing the settings of any other blades in the assembly and without disturbing the fixed setting between slots of the assembly. This permits the rapid replacement of dull blades and/or rearrangement of blades to slit a web to predetermined width. Furthermore, it is possible to reverse the position of a single edge blade in a slot in order to utilize the unused edge of the blade.

Depending upon the length of the plate assembly (this, in turn, is dependent upon the width of the web being slit), a strengthening means, for example, in the form of an elongated angle bar 32 (L-shaped), may be secured to the top of pressure cover plate 19 by bolts. Since greater supporting pressure is required at the center of the holder body, the back of the L-shaped strengthening means is higher at the center than at the ends thereof.

Figure 8 illustrates a modification of the spacer plate which dispenses with the need for an intermediate plate 10. In this modification, a plate 34 having generally the same configuration as plate 12, previously described, has an upper portion 33 of reduced thickness obtained by cutting away, e. g., by machining, one side of the plate to a depth measuring substantially the same as the thickness of the blade to be used. When these plates are assembled in contacting relationship on the shaft 15, the portion of reduced thickness affords a slot serving as a seat for the razor blade as previously described.

The principal advantage of the multiple blade-holding apparatus of the present invention is that the cutting elements may be readily and rapidly replaced or rearranged to cut a web into strips of varying widths without disturbing the basic distance between adjacent slots of the holder and, hence, without disturbing the accuracy of the setting of other blades in the holder. A further and equally important advantage is that the cutting elements may be replaced or readjusted without disturbing the position of the web being slit.

We claim:

1. In a web slitting apparatus comprising two spaced web guide means over which a continuous web is passed under tension and severing means operative to slit the continuous web along its longitudinal axis at predetermined transverse intervals as it passes between said guide means, said severing means positioned above and extending transversely of the path of travel of the web between said guide means, an improved severing means comprising a screw threaded shaft; a plurality of flat plates mounted in face-to-face contact by means of registered holes on said shaft, portions of alternate plates being cut away to provide slots, said slots adapted to seat a cutter blade with a portion of the cutting edge projecting into the path of travel of the web and with the top edge of the blade opposite the cutting edge extending above the top edge of the plate; cutter blades seated in said slots, the thickness of said cutter blades being at least equal to the thickness of said slot-providing plates; means at both ends of said shaft adapted to press the assembled plates together to form a plate assembly rotatable with the shaft; a cover plate bearing on the top edges of the cutter blades, extending the entire length and width of the plate assembly, and rotatable independently of said plate assembly about the axis of said shaft.

2. The improvement of claim 1 wherein said cutter blades are single edge razor blades, each having a clip affixed to its top edge.

3. In a web slitting apparatus comprising two spaced web guide means over which a continuous web is passed under tension and severing means operative to slit the continuous web along its longitudinal axis at predetermined transverse intervals as it passes between said guide means, said severing means positioned above and extending tranversely of the path of travel of the web between said guide means, an improved severing means comprising a screw threaded shaft; a plurality of flat plates mounted in face-to-face contact by means of registered holes on said shaft, each plate having a portion of reduced thickness to provide slots, said slots adapted to seat a cutter blade with a portion of the cutting edge projecting into the path of travel of the web and with the top edge of the blade opposite the cutting edge extending above the top edge of the plate; cutter blades seated in said slots; means at both ends of said shaft adapted to press the assembled plates together to form a plate assembly rotatable with the shaft; a cover plate bearing on the top edges of the cutter blades, extending the entire length and width of the plate assembly, and rotatable independently of said plate assembly about the axis of said shaft.

4. The improvement of claim 3 wherein said cutter blades are single edge razor blades, each having a clip affixed to its top edge.

References Cited in the file of this patent

UNITED STATES PATENTS

| | | |
|---|---|---|
| 2,316,249 | Johnson | Apr. 13, 1943 |
| 2,526,029 | Judelson | Oct. 17, 1950 |
| 2,578,997 | Errig et al. | Dec. 18, 1951 |
| 2,593,388 | Littman | Apr. 15, 1952 |
| 2,638,984 | Errig et al. | May 19, 1953 |

FOREIGN PATENTS

| | | |
|---|---|---|
| 305,139 | Germany | Sept. 17, 1919 |
| 87,520 | Sweden | Oct. 6, 1936 |